United States Patent
Labonte et al.

(10) Patent No.: US 12,517,847 B2
(45) Date of Patent: Jan. 6, 2026

(54) SYSTEM AND METHOD OF HANDLING MODIFICATION TRACKING DATA IN TIMESTEP SHARED MEMORY MULTI-PROCESSORS (TSMP)

(71) Applicant: Samsung Electronics Co., Ltd., Suwon-si (KR)

(72) Inventors: Thomas Labonte, Marlborough, MA (US); Douglas Joseph, Austin, TX (US); Samantika Sury, Westford, MA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/905,885

(22) Filed: Oct. 3, 2024

(65) Prior Publication Data

US 2025/0190377 A1    Jun. 12, 2025

Related U.S. Application Data

(60) Provisional application No. 63/609,221, filed on Dec. 12, 2023.

(51) Int. Cl.
*G06F 13/16* (2006.01)
*G06F 12/0811* (2016.01)
(Continued)

(52) U.S. Cl.
CPC ...... *G06F 13/1663* (2013.01); *G06F 12/0811* (2013.01); *G06F 12/0815* (2013.01); *G06F 12/084* (2013.01); *G06F 12/0844* (2013.01)

(58) Field of Classification Search
None
See application file for complete search history.

(56) References Cited

U.S. PATENT DOCUMENTS 9,348,591 B2    5/2016    Kim et al.
10,235,176 B2   3/2019    DeHon et al.
(Continued)

FOREIGN PATENT DOCUMENTS

EP    3 340 128 B1    9/2023

OTHER PUBLICATIONS

Singh et al. Cache Coherence for GPU Architectures; IEEE 2013; pp. 13 (Year: 2013).*

(Continued)

*Primary Examiner* — Kaushikkumar M Patel
(74) *Attorney, Agent, or Firm* — Womble Bond Dickinson (US) LLP

(57) ABSTRACT

A computer system including a home node having global shared memory and remote nodes configured to access the global shared memory. The home node contains a modification tracker entry and a timestep count entry associated with each cache block. The home node is configured to: set a timestep counter value in the timestep count entry; modify a word in one of the cache blocks in response to a first write operation from one of the remote nodes; set a first modification tracker value in response to the first write operation; modify a word in the one of the cache blocks in response to a second write operation from one of the remote nodes; set a second modification tracker value in response to the second write operation; and perform a violation check in response to a configuration status register value being equal to the timestep counter value.

17 Claims, 4 Drawing Sheets

(51) Int. Cl.
*G06F 12/0815* (2016.01)
*G06F 12/084* (2016.01)
*G06F 12/0844* (2016.01)

(56) References Cited

U.S. PATENT DOCUMENTS

| | | |
|---|---|---|
| 10,579,499 B2 | 3/2020 | Engler et al. |
| 10,740,239 B2 | 8/2020 | Williams et al. |
| 11,188,480 B1 | 11/2021 | Dropps et al. |
| 2016/0154590 A1* | 6/2016 | Fan ................. G06F 3/0656 711/118 |
| 2017/0063985 A1* | 3/2017 | Xun ................. H04J 3/0661 |
| 2019/0205252 A1* | 7/2019 | Loewenstein ......... G06F 12/128 |
| 2020/0073749 A1* | 3/2020 | Xu .................. G06F 11/0745 |

OTHER PUBLICATIONS

Mojumder et al. HALCONE : A Hardware-Level Timestamp-based Cache Coherence Scheme for Multi-GPU systems; Jul. 2020, pp. 13, (Year: 2020).*

Yuan et al. A Timestamp-based Selective Invalidation Scheme for Multiprocessor Cache Coherence; IEEE 1996; pp. 114-121 ( Year: 1996).*

* cited by examiner

SYSTEM AND METHOD OF HANDLING MODIFICATION TRACKING DATA IN TIMESTEP SHARED MEMORY MULTI-PROCESSORS (TSMP)

CROSS-REFERENCE TO RELATED APPLICATION(S)

The present application claims priority to and the benefit of U.S. Provisional Application No. 63/609,221, filed Dec. 12, 2023, entitled "Clearing Modified Word Tracking Entries When Using Timestep SMP," the entire content of which is incorporated herein by reference.

BACKGROUND

1. Field

The present disclosure relates to shared memory multi-processing in a computer system.

2. Description of the Related Art

Shared memory multi-processors (SMP) provide a global address space and interconnect that allow all processors to access all of the main memory in a system. Timestep SMP (TSMP) requires the system on chip (SoC) to track which words in the shared memory have been written by which nodes. Each node has associated metadata to record this information. The metadata is utilized to determine if there is a violation between two or more nodes writing to the same word in the shared memory. Between timesteps, the metadata must be invalidated for the next timestep to avoid raising a false violation. However, clearing the metadata at each timestep would take about 8 milliseconds (ms) in the worst case, which would result in poor performance for TSMP. This delay associated with clearing the metadata at each timestep would severely limit performance in certain applications, such as molecular dynamics simulations.

The above information disclosed in this Background section is only to enhance understanding of background information pertaining to the present disclosure and may contain information that does not constitute prior art.

SUMMARY

The present disclosure relates to various embodiments of a computer system. In one embodiment, the computer system includes a home node including global shared memory and remote nodes configured to access the global shared memory. The home node stores cache blocks each having words, a modification tracker entry associated with each of the cache blocks, and a timestep count entry associated with each of the cache blocks. The home node is configured to: set a timestep counter value in the timestep count entry; modify a word in one of the cache blocks in response to a first write operation from one of the remote nodes; set a first modification tracker value in response to the first write operation; modify a word in the one of the cache blocks in response to a second write operation from one of the remote nodes; set a second modification tracker value in response to the second write operation; and perform a violation check in response to a configuration status register value being equal to the timestep counter value.

The home node may be configured to compare the first modification tracker value following the first write operation to the second modification tracker value following the second write operation to perform the violation check.

The home node may be configured to determine a violation in response to an updated portion of the second modification tracker value being different from a same portion of the first modification tracker value.

The home node may not determine the violation in response to the same portion of the first modification tracker value indicating that it had not been previously written in the current timestep.

The home node may be configured to reset the modification tracker entry in response to the configuration status register value being different than the timestep counter value.

The home node may be further configured to increment the timestep counter value.

The modification tracker value may include a node ID.

The home node may be configured to reset the modification tracker entry in response to the timestep count entry reaching a maximum timestep count.

The home node may include a last level cache (LLC) controller.

The present disclosure relates to various embodiments of a method of managing global shared memory in a computer system including two or more nodes. In one embodiment, the method includes storing, in a home node of the nodes, a cache block including words, a modification tracker field, and a timestep counter field; setting a timestep counter value in the timestep counter field; modifying a word of the words in the cache block in response to a first write request from a remote node; setting a first modification tracker value in response to the first write request; modifying a word of the words in the cache block in response to a second write request from one of the remote nodes; setting a second modification tracker value in response to the second write request; and performing a violation check in response to a configuration status register value being equal to the timestep counter value.

Performing the violation check may include comparing the first modification tracker value following the first write operation to the second modification tracker value following the second write operation.

The method may also include determining a violation in response to an updated portion of the first modification tracker value being different from a same portion of the second modification tracker value.

The method may include not determining the violation in response to the same portion of the first modification tracker value indicating that it was not previously written in a current timestep corresponding to the timestep counter value.

The method may also include resetting the modification tracker entry in response to the configuration status register value being different than the timestep counter value.

The method may also include updating the timestep counter value.

Each of the first modification tracker value and the second modification tracker value may include a node ID.

The method may also include resetting the modification tracker field in response to the timestep count entry reaching a maximum timestep count.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features or tasks may be combined with one or more other described features or tasks to provide a workable method or system.

BRIEF DESCRIPTION OF THE DRAWINGS

The features and advantages of embodiments of the present disclosure will be better understood by reference to the following detailed description when considered in conjunction with the drawings. The drawings are not necessarily drawn to scale.

DETAILED DESCRIPTION

Figure 1:
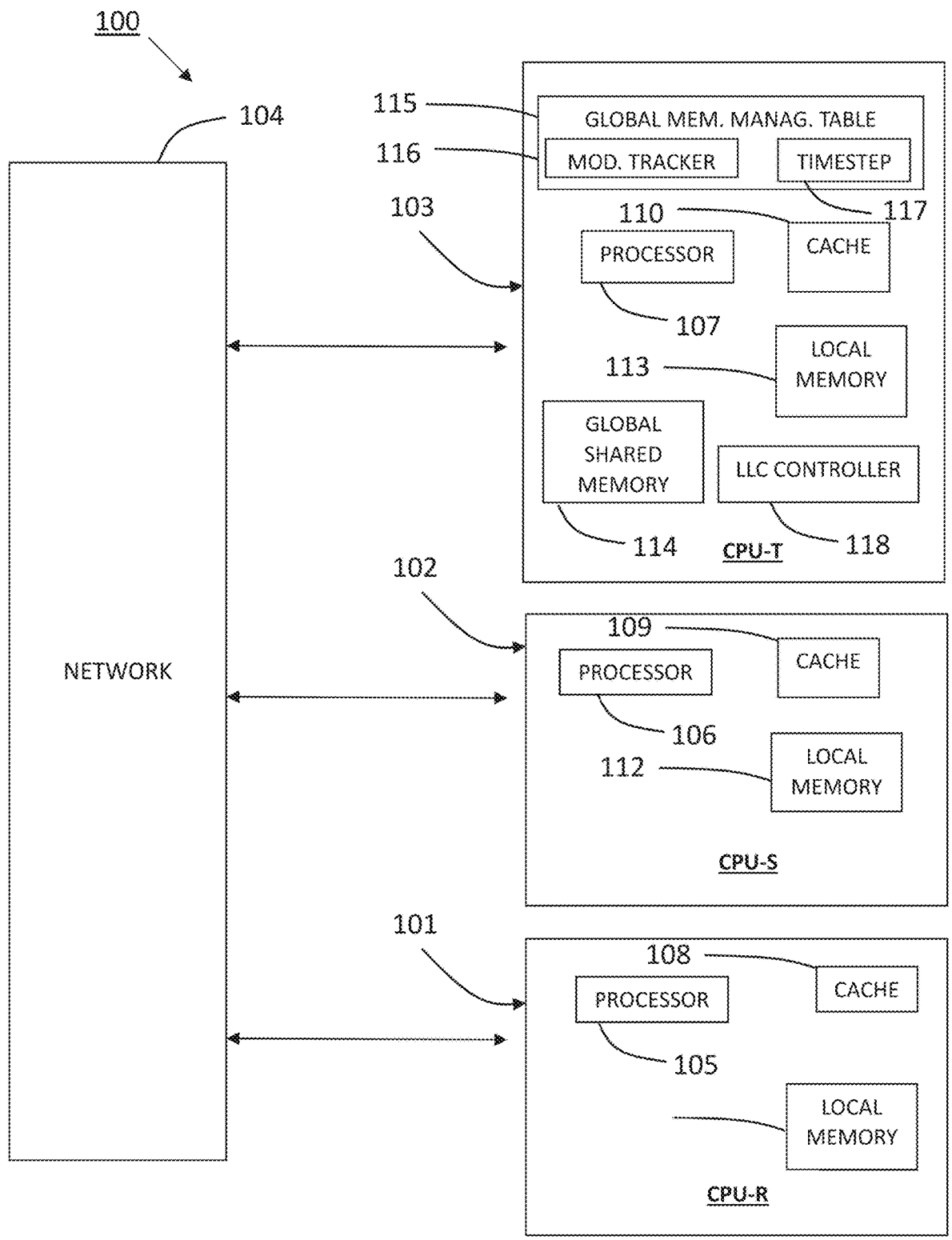
FIG. 1 is a schematic block diagram of a computer system according to one embodiment of the present disclosure.

The present disclosure relates to various embodiments of systems and methods of managing access to global shared memory in a computer system. In one or more embodiments, the systems and methods of the present disclosure store a timestep counter entry and a modification tracker entry and utilize these entries to check for violations in writing data to the global shared memory. The systems and methods of the present disclosure include checking for a violation in response to the configuration status register (CSR) value being equal to the timestep counter value and clearing the modification tracker entry in response to the CSR value being different than the timestep counter value. Utilizing a timestep counter to check for violations and to reset the modification tracker entry results in faster processing than a related art brute force method of clearing the modification tracker information at each timestep. For instance, in the worst case, the related art brute force method would take approximately 8 milliseconds (ms) (depending on the size of the tracking table) to clear the modification tracker information at each timestep. In contrast, the systems and methods of the present disclosure do not clear the modification tracker information at each timestep and therefore avoid the associated delay (e.g., 8 ms at each timestep). In one or more embodiments, the systems and methods of the present disclosure may clear the modification tracker information only in response to the timestep count wrapping from its maximum value back to zero, and the timestep counter may be selected to be arbitrarily large such that the timestep count wrap and the associated clearing event are rare (e.g., for a 32-bit timestep counter, the systems and methods of the present disclosure may clear the modification tracker information only once every 4 billion timesteps).

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 depicts a computer system 100 according to one embodiment of the present disclosure. In the illustrated embodiment, the computer system 100 includes a plurality of nodes (i.e., a first node 101, a second node 102, and a third node 103 labeled CPU-R, CPU-S, and CPU-T, respectively) in communication with each other over a network 104. In the illustrated embodiment, each of the nodes 101, 102, 103 includes one or more processors 105, 106, 107, respectively, one or more caches 108, 109, 110, respectively, and a local memory 111, 112, 113, respectively. The local memory 111, 112, 113 of each node 101, 102, 103, respectively, may be accessible only by the processor 105, 106, 107 of the respective node 101, 102, 103.

The term "processor" is utilized herein to include any combination of hardware, firmware, memory and software, employed to process data or digital signals. The hardware of a processor may include, for example, a microcontroller, application specific integrated circuits (ASICs), general purpose or special purpose central processors (CPUs), digital signal processors (DSPs), graphics processors (GPUs), and programmable logic devices such as field programmable gate arrays (FPGAs). In a processor, as utilized herein, each function is performed either by hardware configured, i.e., hard-wired, to perform that function, or by more general-purpose hardware, such as a CPU, configured to execute instructions stored in non-transitory memory. A processor may contain two or more processors, for example, a processor may include two processors, an FPGA and a CPU, interconnected on a PCB. The memory may include flash memory, ferroelectric random-access memory (FeRAM), magnetoresistive random-access memory (MRAM), phase-change memory (PCM), FeFET memory, and/or resistive random-access memory (RRAM).

In one or more embodiments, the third node 103 (CPU-T) may include global memory 114 (i.e., the third node 103 may be a home node) and the first and second nodes 101, 102 (CPU-R and CPU-S) may be remote nodes configured to access (by read and/or write operations) the global memory 114 of the third node 103. In one or more embodiments, the global memory 114 may be High Bandwidth Memory (HBM). Although in the illustrated embodiment the third node 103 is the home node, in one or more embodiments any one of (or any combination of) the first node 101, the second node 102, and the third node 103 may be a home node (e.g., each of the first node 101, the second node 102, and the third node 103 may be a home node such that the global memory of each of the nodes together forms a single global memory). Additionally, although three nodes are depicted, in one or more embodiments the computer system 100 may include any other suitable number of nodes, such as two nodes or more than three nodes (e.g., tens, hundreds, or thousands of nodes).

Additionally, in the illustrated embodiment, the third node 103 includes a global memory tracking table (GMTT) 115 that includes a modification tracker field 116 and a timestep counter field 117. The entry in the modification tracker field 116 is a modification tracker value (e.g., a series of bits) that indicates which word in particular cache block was modified by a write operation of one of the remote nodes 101, 102. The entry in the modification tracker field 116 may also include a node ID indicating which of the remote nodes 101, 102 modified which word in the cache block. The entry in the timestep counter field 117 includes a timestep counter value that indicates the timestep in which that modification tracker entry was last written during operation of the computer system 100. In the illustrated embodiment, the third node 103 also includes a last level cache (LLC) controller 118 configured to read and manage the entry in the timestep counter field 117.

Figure 2A:
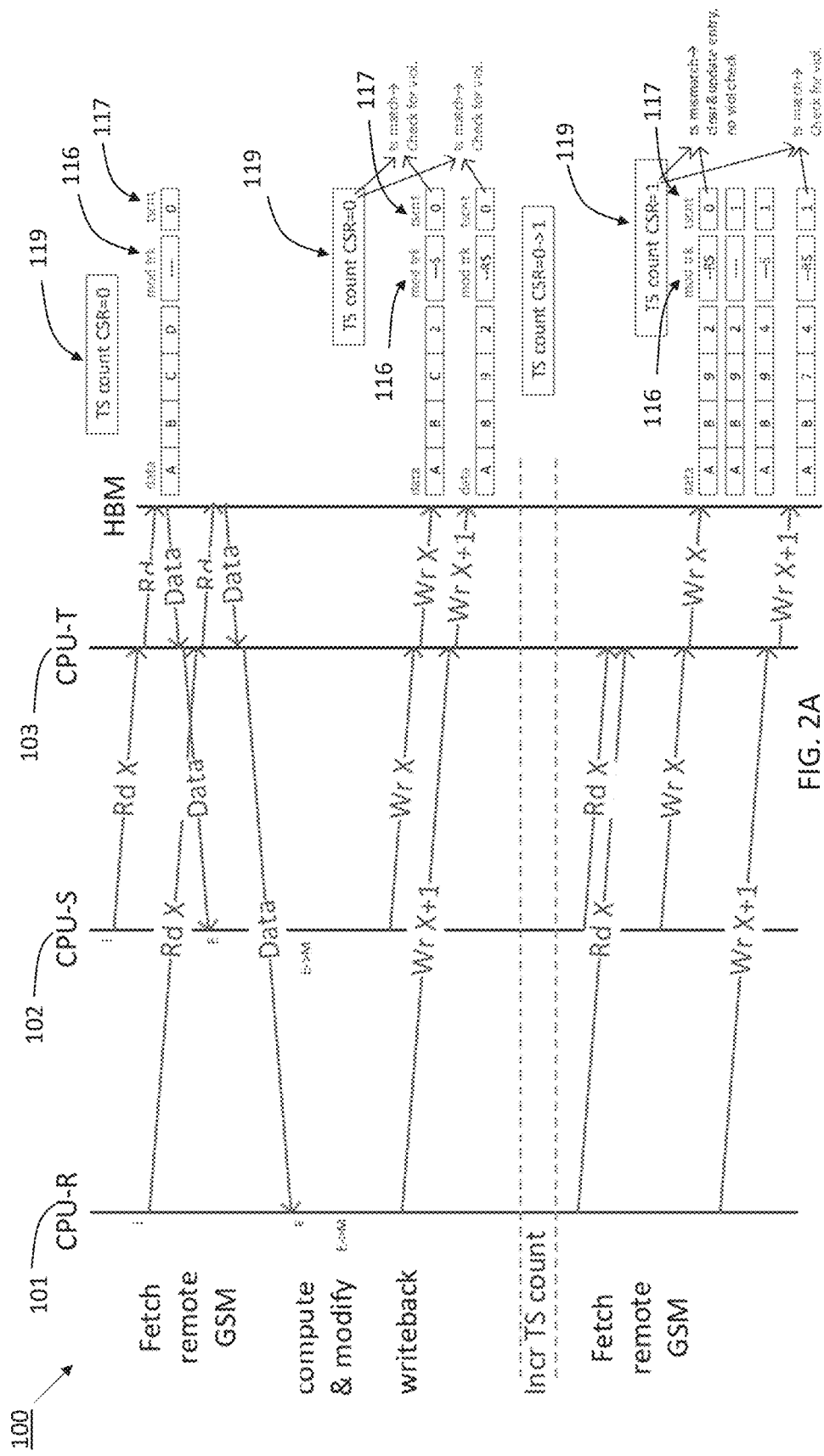
FIGS. 2A-2B depict operation of the computer system of FIG. 1 according to one embodiment of the present disclosure.
Figure 2B:
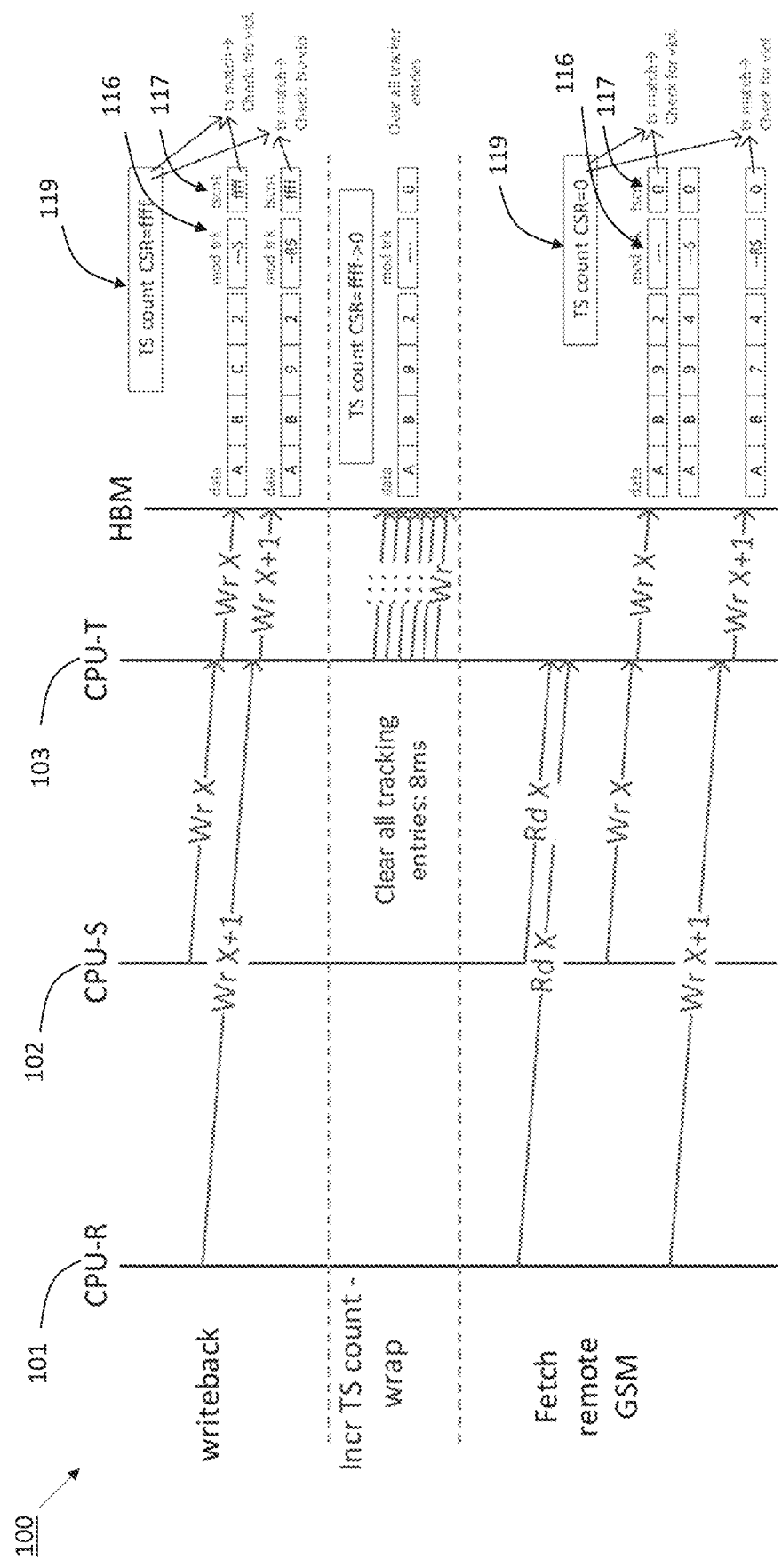

FIGS. 2A-2B depict operation of the computer system 100 according to one embodiment of the present disclosure. As illustrated in FIGS. 2A-2B, the home node 103 (CPU-T) stores, in its global memory 114, a cache block including words (labeled "A", "B", "C" and "D"), a modification tracker entry in the modification tracker field 116 that is configured to indicate which word in the cache block has been modified, and a timestep counter entry in the timestep counter field 117 that is configured to indicate the timestep in which the associated cache block and modification tracking entry was last written 114. Although in the illustrated embodiment the modification tracker entry includes four bits corresponding to the four words ("A", "B", "C" and "D"), the modification tracker entry may include any other suitable number of bits depending on the number of words in the cache block. Additionally, in one or more embodiments, the modification tracker entry in the modification tracker field 116 may include a node ID indicating which of the remote nodes 101 or 102 modified which word in the cache block in addition to indicating which word was modified (e.g., each modification tracker entry may hold a record of which remote node wrote which word, or whether a word has not been written in the current timestep). Systems and methods for setting the modification tracker entry are disclosed in U.S. patent application Ser. No. 18/483,486, filed Dec. 19, 2023, entitled "Systems and Methods for Computing with Multiple Nodes," the entire content of which is incorporated herein by reference.

As shown in the upper portion of FIG. 2A, at an initial timestep the timestep counter value in the timestep counter field 117 is set to "0" and the modification tracker value in the modification tracker field 116 is set to "---," which indicates that the words ("A", "B", "C" and "D") in the cache block have not been modified. The upper portion of FIG. 2A depicts the remote nodes 101, 102 (CPU-R and CPU-S) accessing the global shared memory 114 of the home node 103 (CPU-T) with read operations Rd X and the corresponding transmission of the accessed data back to the remote nodes 101, 102 (CPU-R and CPU-S). As also shown in the upper portion of FIG. 2A, a configuration status register (CSR) maintains a timestep count 119 (e.g., 0) that is not associated with the modification tracker value in the modification tracker field 116 or the timestep counter value in the timestep counter field 117.

For each newly arriving write operation to the global shared memory 114 of the home node 103 (CPU-T), the timestep value in the timestep counter field 117 is compared to the timestep value 119 stored in the CSR and the modification tracker entry is checked against the existing modification tracker entry in the modification tracker field 116. In response to the new write operation overwriting a word that the modification tracker entry in the modification tracker field 116 indicates was previously written by a different remote node and the previous write operation occurred in the current timestep (as indicated by the timestep count in the timestep counter field 117 being equal to the current timestep count 119 stored in the CSR), a violation is raised. There is no violation if the modification tracker entries at the same timestep indicate that the different remote nodes did not write the same words.

Regardless of whether a violation is raised, every write operation will update the timestep count in the timestep counter field 117 associated with the modification tracking entry that was updated. The new value of the timestep count in the timestep counter field 117 is obtained from the current timestep count 119 stored in the CSR.

In one or more embodiments, a temporary modification tracker entry may be created that represents a newly arriving write with a set of node ID fields reflecting which words were written by the remote node (e.g., the temporary modification tracker entry may be created by filling in the node id of the writer in the position of each of the words that were written, and the positions of the temporary modification tracker entry corresponding to the words that were not written may be masked out). In one or more embodiments, any of the words in the current modification tracker entry that have not been modified in the timestep may also be masked out. This temporary modification tracker entry may then be compared against the current modification tracker entry for that cache line. For each word that was written by the newly arriving write, a violation is raised in response to the two modification tracker entries containing different node IDs, and the previous write occurring in the current timestep. The permanent modification tracker entry may then be updated with the contents of the temporary modification tracker entry.

For instance, as shown in the middle portion of FIG. 2A, at the initial timestep "0" the second remote node 102 (CPU-S) performs a first write operation (Wr X) that modifies the fourth word in the cache block (from "D" to "2" in FIG. 2A). Additionally, in response to this first write operation (Wr X), the modification tracker value in the modification tracker field 116 is updated from "---" to "---S" to indicate that the fourth word was modified. Additionally, at the initial timestep "0" the first remote node 101 (CPU-R) performs a second write operation (Wr X+1) that modifies the third word in the cache block (from "C" to "9"). In response to this second write operation (Wr X+1), the modification tracker in the modification tracker field 116 is updated from "---S" to "--RS" to indicate that the third word was modified in the second write operation (Wr X+1), in addition to the fourth word being updated in the first write operation (Wr X).

In the illustrated embodiment, at the initial timestep "0" (i.e., when the timestep count 119 in the CSR is set to "0") the home node 103 is configured to compare the timestep counter value stored in the timestep counter field 117 associated with the first write operation (Wr X) to the timestep count 119 stored in the CSR. Because these timestep counts match (i.e., both are "0"), a violation check is performed. However, because the first write operation (Wr X) was the first write operation to modify a word in the cache block (from "---" to "---S"), there is no violation. Additionally, at the initial timestep "0", the home node 103 is configured to compare the timestep counter value stored in the timestep counter field 117 associated with the second write operation (Wr X+1) to the timestep count 119 stored in the CSR. Because these timestep counts match (i.e., both are "0"), a violation check is performed. However, because the updated portion of the modification tracker field 116 associated with the second write operation (Wr X+1) (the "R" in "--RS") is compared to the "-" in the same position of the modification tracker field 116 associated with the first write operation (Wr X) ("---S"), there is no violation. That is, the word written by the second write, indicated by "R", was not previously written by a different node in the same timestep, as indicated by the "-" in the same position, and thus there is no violation. If the same position of the modification tracker field had already contained an "R" (indicating that the same node had previously written that word), then that would also not be a violation.

As shown in the lower portion of FIG. 2A, at a subsequent timestep, the timestep count 119 in the CSR is incremented to "1". Additionally, as shown in the lower portion of FIG. 2A, at the timestep "1" (i.e., when the timestep counter in the CSR is set to "1"), the second remote node 102 (CPU-S) performs a first write operation (Wr X) that modifies the fourth word in the cache block (from "2" to "4"). In response to this first write operation (Wr X) from the second remote node 102 (CPU-S), the home node 103 (CPU-T) is configured to compare the stored timestep counter field 117 that is associated with the modification tracker entry in the modification tracker field 116 against the timestep count 119 stored in the CSR. In the illustrated embodiment, the timestep count is "0" for the modification tracker entry and does not match the timestep count of "1" stored in the CSR, thus a violation check is not performed, and the previous modification tracker entry is cleared from "--RS" to "---" and the timestep count entry in the modification tracker field is updated to "1" to match the timestep count stored in the CSR. Furthermore, the modification tracker entry is updated from '---' to '---S' to record the newly written word resulting from the write operation (Wr X) from the second remote node 102 (CPU-S).

Additionally, at the timestep "1" the first remote node 101 (CPU-R) performs a second write operation (Wr X+1) that modifies the third word in the cache block (from "9" to "7"). In response to this second write operation (Wr X+1) at the timestep count "1", the modification tracker value in the modification tracker field 116 is updated from "---S" to "--RS" to indicate that the third word was modified in the second write operation (Wr X+1), in addition to the fourth word being updated in the first write operation (Wr X). Upon arrival of the second write (Wr X+1), the home node 103 (CPU-T) is configured to compare the timestep count recorded in the associated modification tracker entry against the timestep count stored in the CSR. In the illustrated embodiment, the values match (i.e., both the timestep count in the timestep counter field 117 and the timestep count 119 in the CSR are "1") and thus the home node 103 (CPU-T)

performs a violation check. However, because the new transaction is writing a word that was not previously written in this timestep, as indicated by the modification tracker entry (i.e., the modification tracker entry is updated from "---S" to "--RS"), there is no violation, and the new write is recorded with the node ID for that word being written in the modification tracker entry. Although FIG. 2A depicts only a first write operation and a second write operation, the above-described process of comparing the timestep counter value associated with a modification tracker entry to the timestep value stored in the CSR and reporting a violation in response to the updated portion of the modification tracker entries mis-matching with their previous value at the same timestep may be performed for any other number of write operations (i.e., the above-described process may be performed for an arbitrary number of write operations to a cache line within a timestep).

With reference now to FIG. 2B, the home node 103 (CPU-T) is configured to reset the modification tracker value in all modification tracker fields 116 to "---" and the timestep count to "0" in response to the timestep counter value in the central timestep CSR wrapping from its maximum value back to 0. Otherwise, if the modification tracker value were not reset after the timestep counter reached a maximum value, the system 100 could inadvertently check for and determine a violation even though a violation did not occur. For instance, if a write operation occurred at timestep "0" and then another write operation was not performed until the timestep counter reached its maximum value and then restarted at timestep "0", the system could inadvertently check for a violation because the timestep values are identical even though the write operations were actually performed at two different times. In this manner, resetting the modification tracker value in the modification tracker field 116 in response to the timestep counter reaching a maximum value is configured to prevent a false violation.

As shown in the lower portion of FIG. 2B, following resetting of the modification tracker value to "---" and the timestep count to "0" in response to the timestep counter reaching a maximum value, the second remote node 102 (CPU-S) performs a first write operation (Wr X) that modifies the fourth word in the cache block (from "2" to "4"). In response to this first write operation (Wr X), the modification tracker value in the modification tracker field 116 is updated from "---" to "---S" to indicate that the fourth word was modified. Additionally, at the timestep "0" the first remote node 101 (CPU-R) performs a second write operation (Wr X+1) that modifies the third word in the cache block (from "9" to "7"). In response to this second write operation (Wr X+1), the modification tracker value in the modification tracker field 116 is updated from "---S" to "--RS" to indicate that the third word was modified in the second write operation (Wr X+1), in addition to the fourth word being updated in the first write operation (Wr X).

Figure 3:
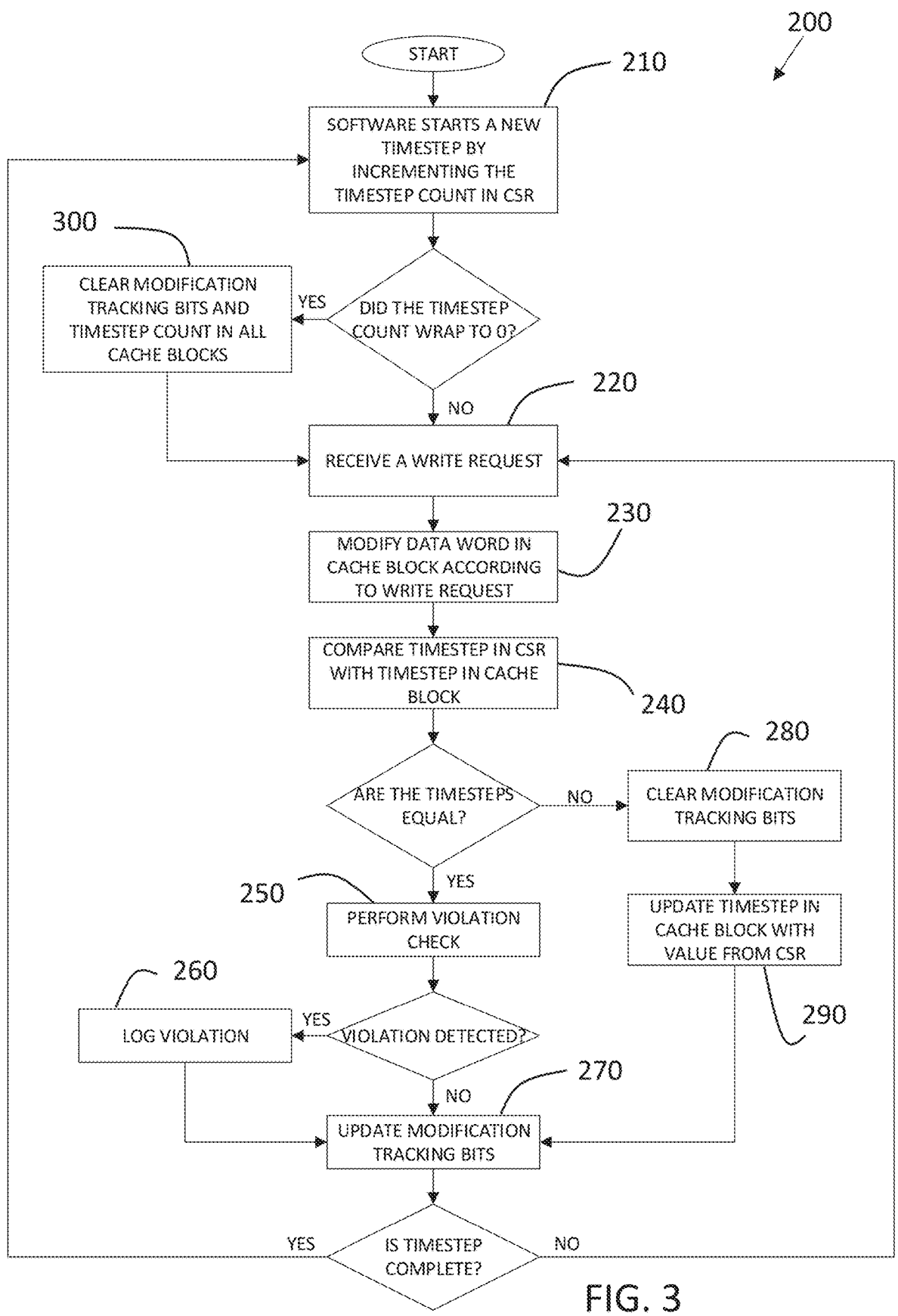
FIG. 3 is a flowchart illustrating tasks of a method of operating a computer system according to one embodiment of the present disclosure.

FIG. 3 is a flowchart illustrating tasks of a method 200 of accessing (reading and writing) data from/to global shared memory of a home node in a computer system. In the illustrated embodiment, the method 200 includes a task 210 of setting a timestep value (count) of a timestep counter (e.g., initializing the timestep counter) stored in the home node (e.g., setting the timestep value to "0"). That is, the task 210 includes starting a new timestep by incrementing the timestep count in the configuration status register (CSR).

The method 200 also includes a task 220 of receiving a write request from one of the remote nodes of the computer system and a task 230 of modifying a data word in a cache block of the home node in response to receiving the first write request in task 220 (i.e., the task 220 includes modifying a data word in a cache block according to the write request in task 210).

Additionally, in the illustrated embodiment, the method 200 also includes a task 240 of comparing the timestep value in the cache block to the timestep value in the CSR (e.g., the time stamp counter of the processor). In response to the timestep value in the cache block being the same as the timestep value in the CSR (e.g., first and second write requests occurring during the same timestep), the method 200 includes a task 250 of performing a violation check by comparing a modification tracker value prior to the write request in task 220 to the modification tracker value following the write request in task 220. In response to a violation being detected (e.g., the updated portion of the modification tracker value being different from the previous value and the previous value indicating that it had already been written in this timestep), the method 200 includes a task 260 of logging a violation. In response to a violation not being detected (e.g., the updated portion of the modification tracker values matching the previous value or the previous value indicating that it had not yet been written in this timestep) or following the logging of the violation in task 260, the method 200 includes a task 270 of updating the modification tracking bits. Updating the modification tracking bits in task 270 may include setting a modification tracker value indicating which word was modified by the write request in task 220 (e.g., the location of the modified word in the cache block). For instance, in one or more embodiments, the task 270 may including setting the modification tracker value to "---S" in response to the write request modifying the fourth word in the cache block. Additionally, in one or more embodiments, the task 270 may indicate which remote node modified the word in the cache block (e.g., the task 270 may include storing a node ID of the remote node that modified the word in the cache block in task 220).

In one or more embodiments, the method 200 does not include the task 250 of performing a violation check, even if the timestep value is equal to the time stamp counter of the CSR, if the write request in task 220 is from the same remote node that performed the prior write request. That is, two or more write requests from the same remote node during a given timestep does not result in a violation check.

In response to the timestep value in the cache block not being equal to the timestamp counter of the CSR (e.g., the timestep of a second write request not being equal to the timestep of a first write request), the method 200 includes a task 280 of clearing the modification tracker information stored in the modification tracker field (e.g., resetting the modification tracker value to "---") and a task 290 of updating the timestep value in the cache block with the timestep value from the CSR. If the timestep value in the cache block is not equal to the CSR value, this indicates that the write request in task 220 is the first write request for a given timestep and therefore the modification tracker value can be reset (i.e., cleared).

The method 200 is configured to return to the step 210 of incrementing the timestep count in the CSR in response to the timestep being complete and is configured to return to task 220 of receiving a write request in response to the timestep not being complete.

Additionally, in one or more embodiments, the method 200 includes a task 300 of resetting the timestep counter (e.g., setting the timestep counter to "0") and resetting the modification tracker values (e.g., setting the modification tracker values to "---") in response to the timestep counter reaching a maximum timestep count (e.g., the timestep count wrapping to 0). As described above, if the tracking entries were not reset after the timestep counter reached its maximum count, the method 200 could inadvertently check for and report a false violation.

Embodiments of the subject matter and the operations described in this specification may be implemented in analog or digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A computer system comprising:
a home node comprising global shared memory; and
a plurality of remote nodes configured to access the global shared memory,
wherein the home node stores a plurality of cache blocks each having a plurality of words, a modification tracker field associated with each of the plurality of cache blocks, and a timestep counter field associated with each of the plurality of cache blocks, and
wherein the home node is configured to:
set a timestep counter value in the timestep counter field;
modify a word in one of the plurality of cache blocks in response to a first write request from one of the plurality of remote nodes;
set a first modification tracker value in response to the first write request;
modify a word in the one of the plurality of cache blocks in response to a second write request from one of the plurality of remote nodes;
set a second modification tracker value in response to the second write request; and
perform a violation check in response to a configuration status register value being equal to the timestep counter value.

2. The computer system of claim 1, wherein the home node is configured to compare the first modification tracker value following the first write request to the second modification tracker value following the second write request to perform the violation check.

3. The computer system of claim 2, wherein the home node is configured to determine a violation in response to an updated portion of the second modification tracker value being different from a same portion of the first modification tracker value.

4. The computer system of claim 3, wherein the home node is configured not to determine the violation in response to the same portion of the first modification tracker value indicating that it was not previously written in a current timestep corresponding to the timestep counter value.

5. The computer system of claim 1, wherein the home node is configured to reset the modification tracker field in response to the configuration status register value being different than the timestep counter value.

6. The computer system of claim 5, wherein the home node is further configured to increment the configuration status register value.

7. The computer system of claim 1, wherein the first modification tracker value and the second modification tracker value each further comprise a set of node IDs, with a word of a cache line having a node ID associated with it or a null value.

8. The computer system of claim 1, wherein the home node is configured to reset all modification tracker fields in response to the configuration status register value wrapping from a maximum value back to 0.

9. The computer system of claim 1, wherein the home node comprises a last level cache (LLC) controller.

10. A method of managing global shared memory in a computer system comprising a plurality of nodes, the method comprising:
    storing, in a home node of the plurality of nodes, a cache block comprising a plurality of words, a modification tracker field, and a timestep counter field;
    setting a timestep counter value in the timestep counter field;
    modifying a word of the plurality of words in the cache block in response to a first write request from one of a plurality of remote nodes;
    setting a first modification tracker value in response to the first write request;
    modifying a word of the plurality of words in the cache block in response to a second write request from one of the plurality of remote nodes;
    setting a second modification tracker value in response to the second write request; and
    performing a violation check in response to a configuration status register value being equal to the timestep counter value.

11. The method of claim 10, wherein the performing the violation check comprises comparing the first modification tracker value following the first write request to the second modification tracker value following the second write request.

12. The method of claim 11, further comprising determining a violation in response to an updated portion of the second modification tracker value being different from a same portion of the first modification tracker value.

13. The method of claim 12, further comprising not determining the violation in response to the same portion of the first modification tracker value indicating that it was not previously written in a current timestep corresponding to the timestep counter value.

14. The method of claim 10, further comprising resetting the second modification tracker value in response to the configuration status register value being different than the timestep counter value.

15. The method of claim 10, further comprising incrementing the configuration status register value.

16. The method of claim 10, wherein each of the first modification tracker value and the second modification tracker value contains a set of node IDs, each of which is associated with a word of the cache line.

17. The method of claim 10, further comprising resetting all modification tracker entries in response to the configuration status register value wrapping from a maximum value back to 0.

* * * * *